Patented Nov. 27, 1928.

1,693,025

UNITED STATES PATENT OFFICE.

ELMER E. ELDREDGE, OF WILMETTE, ILLINOIS, ASSIGNOR TO KRAFT-PHENIX CHEESE COMPANY, OF CHICAGO, ILLINOIS, A CORPORATION OF ILLINOIS.

PRESERVATION OF CHEESE.

No Drawing. Application filed February 10, 1927, Serial No. 167,366. Renewed May 18, 1928.

The invention relates to the art of preserving cheese and the principal objects of the invention are to provide processes or methods of preserving certain types of cheese which, so far as heretofore known, do not respond to the methods formerly practiced for preserving or sterilizing cheese or cheese products, and to provide a process which will not seriously or perceptively alter the character of the cheese in respect of body, texture, flavor, or nutritive properties.

The invention will be described in connection with the improving of the keeping qualities of cheeses of the "club" type and those having cream cheese as the principal constituent.

The invention in its preferred aspect contemplates the use of an added ingredient comprising a relatively small percentage of an edible, that is to say, non-toxic gum which serves to prevent disintegration or other impairment of the material during or as an incident to the destruction of the degenerative organisms contained in the starting material. As an instance of such non-toxic or edible gum which may be used for this purpose, I have obtained excellent results with pectin, preferably pectin prepared from citrous fruits such as lemons, purchasable on the open market in soluble dry form.

*Example 1.*—Cream cheese combined with added materials to form a relish.

Take a batch of fresh cream cheese of good commercial grade (made from milk having its butter fat content raised to 65% dry basis).

Prepare a solution of fruit pectine. I have successfully employed "80 pectin" for this purpose. In this connection "80" means pectin material having a jellification value of 80 pounds of sugar to one pound of pectin material. Pure pectin has about double such jellification value. For each hundred pounds of cream cheese, I use ¾% of the commercial 80 or 50% strength pectin so that for each one hundred pound batch there is employed ⅜ pounds or 6 ounces of pure pectin. This commercial pectin material is dissolved in from four to ten times its weight of water and is incorporated with the batch by stirring it in at ordinary room temperature. After stirring in and thoroughly incorporating the pectin, relish ingredients such as cut up pimentos, pickles, etc., may be added in quantities to produce the desired taste. After the mixing of the batch is complete, the material is preferably packed in sealed containers. I have ordinarily employed for this purpose glass jars having screw caps. However, although it is desirable to employ a reasonably air tight seal, an absolutely hermetic seal is not essential to obtain satisfactory commercial results.

After the jars have been filled and closed, they are immersed in hot water and thereby heated for a sufficient length of time to destroy or kill the various organisms which normally would cause a rapid deterioration of the untreated material. In the case of the example given, and employing 6 ounce glass jars, water at a temperature of 160° is employed and it is found that when subjected to this treatment the material in the center of the jar will attain a temperature of about 150° F. at the expiration of one hour or less.

Ordinarily, according to my experience the undesirable organisms which have the greatest effect in causing deterioration of the product will be killed at a temperature of 150° F. For obvious reasons it is preferable not to employ any higher temperature than necessary to obtain the desired result. In order to reduce the time of the heating process, a vigorous circulation in the water bath is of some value. Obviously, larger containers require a longer period of treatment than small containers which have relatively large surface area compared with their cubical content. After the heating step the containers are cooled and the cheese is then ready for shipment.

A cheese containing relish ingredients prepared, packed, and treated according to the above method will keep as long as six weeks at ordinary room temperatures, whereas ordinary cream cheese with or without the relish ingredients incorporated therein, and even when prepared from pasteurized milk and cream, will not keep more than two days or less, at ordinary room temperature of say 70° F.

The old methods of sterilizing, pasteurizing, or heat treating of cheese have been found to be inapplicable to the treatment of cheeses of the cream type, for the reason that cheese when subjected to such treatment is so changed in texture, body and flavor, as to bear little resemblance to the original material and is wholly unsalable as such. On the other hand, similar cheeses of the cream type when subjected to this improved process, suffer no perceptible deterioration in texture, body, flavor, or other qualities possessed by the original material.

*Example 2.*—Club cheese.

Club cheese is the name usually given to a cheese which is prepared by grinding up cheeses of the American type which have arrived at the proper stage of cure, to which, if desired, may be added a small percentage of butter to give the desired body and flavor. Ordinarily this club cheese is made from cheese which has reached a rather advanced stage of curing, and such cheese has a certain individuality of texture, body and flavor which distinguishes it from the ordinary American cheese of the cheddar type. So far as I am aware, no one has ever been able to put up this club cheese in such form or to treat it successfully after packaging to the extent necessary to materially improve its keeping qualities without spoiling the characteristic texture, body and flavor generally accepted for club cheese.

In applying the invention to club cheese, the cheese is first ground up in the same way as when making club or potted cheese and to the ground up cheese there is added a solution of so-called 80 soluble pectin in amount approximating 2% by weight of the original cheese. The pectin solution is prepared by dissolving the solid substance in from four to ten times its weight in water and is thoroughly mixed in with the ground up cheese.

After the pectin solution has been incorporated with the ground up cheese, the mass is warmed to a temperature above the melting point of butter fat (95° F.). It is not necessary, and ordinarily not desirable, to exceed a temperature of 125° F. on account of the fact that casein becomes plastic at a temperature of approximately 125° F. The mass is stirred vigorously in the ordinary water jacketed mixing kettle while the heat is being applied so that all parts of the mass attain the same uniform temperature.

After the desired temperature has been obtained, the material is packed into suitable containers which need not necessarily be of the hermetic type. I have successfully used glass jars having screw tops and containing about six ounces of the finished product. The filled and closed jars are then heated in a water bath for about an hour at a temperature of about 160° F. so that all parts of the cheese, even in the center of the container, attain a temperature of 150° F. The jars are then removed, cooled and are ready for shipment.

Cheese of the club type prepared, packaged and treated in this manner will keep many times as long as ordinary club cheese without any material deterioration in flavor, body, texture or salability and the cheese so prepared possesses all of the characteristics of regular club cheese.

The invention disclosed herein, in its broader phases, is claimed in my co-pending application, Serial No. 198,697, filed June 13, 1927.

The described details of process are illustrative of preferred applications only of the invention, the scope of which should be determined by reference to the appended claims, said claims being construed as broadly as possible, consistent with the state of the art.

I claim as my invention:

1. The improvement in the art of preventing deterioration in cheese while preserving the normal characteristics thereof which consist in incorporating with the cheese a relatively small percentage of pectin, and subsequently heating same sufficiently to kill the contained organisms which normally cause deterioration, while not exceeding a temperature of approximately 150° F.

2. The improvement in the art of preventing deterioration in cheese which consists in incorporating with the cheese a relatively small percentage of a pectin substance, and subsequently heating the material to destroy deleterious organisms.

3. The improvement in the art of enhancing the keeping qualities of cheese while maintaining its normal desirable characteristics, which consists in incorporating with the cheese a relatively small percentage of pectin, while not exceeding a temperature of that at which casein normally becomes plastic, subdividing the mass, and then packing in closed containers and then heating the containers and contents while in a quiescent state so as to kill the contained deleterious organisms.

4. The improvement in the art of preventing deterioration in cheese while preserving its desirable characteristics, which consists in comminuting the cheese, mixing with the comminuted material a relatively small percentage of water soluble pectin while not exceeding a temperature of 125° F., subdividing the mixed material, introducing the same into closed shipping receptacles and then heating the material while in the containers to a temperature not materially in excess of 150° F., while maintaining the contents of the containers substantially quiescent.

ELMER E. ELDREDGE.